United States Patent
Lalinde et al.

(10) Patent No.: US 12,554,289 B2
(45) Date of Patent: Feb. 17, 2026

(54) INFORMATION HANDLING SYSTEM HINGE HAVING OVERBEND ALERT

(71) Applicant: Dell Products L.P., Round Rock, TX (US)

(72) Inventors: Paul Lalinde, Spring, TX (US); Anthony J. Sanchez, Pflugerville, TX (US); Allen B. McKittrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/584,604

(22) Filed: Feb. 22, 2024

(65) Prior Publication Data
US 2025/0271908 A1    Aug. 28, 2025

(51) Int. Cl.
*G06F 1/16*    (2006.01)
*F16C 11/04*    (2006.01)

(52) U.S. Cl.
CPC ............ *G06F 1/1681* (2013.01); *F16C 11/04* (2013.01)

(58) Field of Classification Search
CPC ..... G06F 1/1681; E05D 11/08; E05D 11/084; E05D 11/087
See application file for complete search history.

(56) References Cited

U.S. PATENT DOCUMENTS

| | | | |
|---|---|---|---|
| 7,602,606 B2 | 10/2009 | Schlesener et al. | |
| 7,870,644 B2 * | 1/2011 | Chang | H04M 1/0216 16/337 |
| 9,388,617 B2 * | 7/2016 | Onda | E05D 11/082 |
| 9,477,269 B2 | 10/2016 | Morrison et al. | |
| 9,507,388 B1 | 11/2016 | Hampton et al. | |
| 10,817,082 B1 * | 10/2020 | Yildiz | G06F 3/03545 |
| 11,099,611 B2 | 8/2021 | Hallar et al. | |
| 11,099,612 B2 * | 8/2021 | Sanchez | G06F 1/1616 |
| 11,415,200 B2 * | 8/2022 | Hsiao | G06F 1/1681 |
| 11,675,396 B2 * | 6/2023 | Yang | H04M 1/0216 361/679.27 |
| 12,146,354 B2 * | 11/2024 | Chang | E05D 11/087 |
| 2010/0064477 A1 * | 3/2010 | Wang | G06F 1/1681 16/337 |
| 2010/0269296 A1 * | 10/2010 | Lin | G06F 1/1681 16/342 |
| 2015/0121654 A1 * | 5/2015 | Novin | E05D 3/02 16/273 |
| 2021/0034116 A1 | 2/2021 | Torres et al. | |
| 2024/0068286 A1 * | 2/2024 | Larson | E05D 11/1078 |

* cited by examiner

Primary Examiner — Anthony Q Edwards
(74) Attorney, Agent, or Firm — Zagorin Cave LLP; Robert W. Holland

(57) ABSTRACT

A portable information handling system hinge rotates in an operational range with an operational torque and in an overbend range with an overbend torque of at least twice the operational torque. A rotational orientation sensor detects rotation past the operational range into the overbend range and commands an alarm to present an alert, such as an audible or visual alarm. The hinge transitions from torque generated by a first set of cams in the operational range to torque generated by a second set of cams in the overbend range with a transition range that ramps the torque up to define rotation stop felt by an end user rotating the information handling system housing.

20 Claims, 13 Drawing Sheets

INFORMATION HANDLING SYSTEM HINGE HAVING OVERBEND ALERT

BACKGROUND OF THE INVENTION

Field of the Invention

The present invention relates in general to the field of portable information handling systems, and more particularly to an information handling system hinge having overbend alert.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

In many instances, portable information handling system housing portions rotate between a fully closed position to a fully opened position of between 120 to 135 degrees. Typically, rotation to 135 degrees is the most that an end user will use for viewing the display while typing at the keyboard. Limiting rotation to 135 degrees tends to reduce the size of the hinge since the housing portions do not separate from each other to find room for rotation around the housing rear edge. The hinge will generally include a stop at between 120 to 135 degrees of open to prevent excess rotational movement that can stress the housing and the hinge. When force is applied against the housing at the stop, damage can occur to the housing and/or hinge. Over stressing the hinge-up can introduce several types of failures, such as mechanical housing deformation, hinge delamination, display panel cracks and a crack of a hinge barrel on the housing lid portion. In some instances, the hinge plate can peel off the LCD cover, the hinge can break free from the base, the display panel cover can deform or other types of damages may occur. Generally, the end user is given very little feedback when rotation approaches the full open angle other than hitting against the rotation stop. Once a hinge overbend occurs, the damage is difficult to determine but can break the stop so that further damage becomes even more difficult to prevent.

SUMMARY OF THE INVENTION

Therefore, a need has arisen for a system and method which soft stops a hinge when an operational rotation range is exceeded.

In accordance with the present invention, a system and method are provided which substantially reduce the disadvantages and problems associated with previous methods and systems for managing information handling system hinge rotation ranges. A hinge generates operational torque in an operational rotation range and simulates a "soft" stop of rotation at the end of the operational rotation range and through an overbend rotation range.

More specifically, a portable information handling system processes information with a processor and memory disposed in convertible housing that rotates a lid portion relative to a main portion about a hinge. The hinge rotates an axle and a cam member, the cam member having cam surfaces that engage against a support member and a torque member to generate torque with friction that resists rotation of the cam member. The cam surfaces generate an operational torque in an operational rotation range of the hinge, such as from a closed position to open 120 degrees. The cam surfaces generate an overbend torque in an overbend rotation range beyond the operational rotation range that indicates to an end user that the housing rotation has exceeded normal operations, such as two or greater times the operational torque. An alert is provided to the end user at the rotation soft stop where the operational rotation range transitions to the overbend rotation range, such as an audible, light or haptic alert.

The present invention provides a number of important technical advantages. One example of an important technical advantage is that an information handling system that limits housing lid rotation allows rotation beyond the limit with an overbend torque of greater than the operational torque associated with normal operating conditions. The rotation past the operational range is allowed but with greater difficulty than in normal operating conditions so that the end user is provided with a de facto warning that the housing has over rotated. An audible, light and/or haptic warning of over rotation beyond the normal operational range may also be provided.

BRIEF DESCRIPTION OF THE DRAWINGS

The present invention may be better understood, and its numerous objects, features and advantages made apparent to FIG. 1 depicts an information handling system hinge with operational and overbend rotation ranges.

DETAILED DESCRIPTION

A portable information handling system hinge allows for overbending to protect against system damage and incudes an alarm that alerts an end user to an overbend event. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
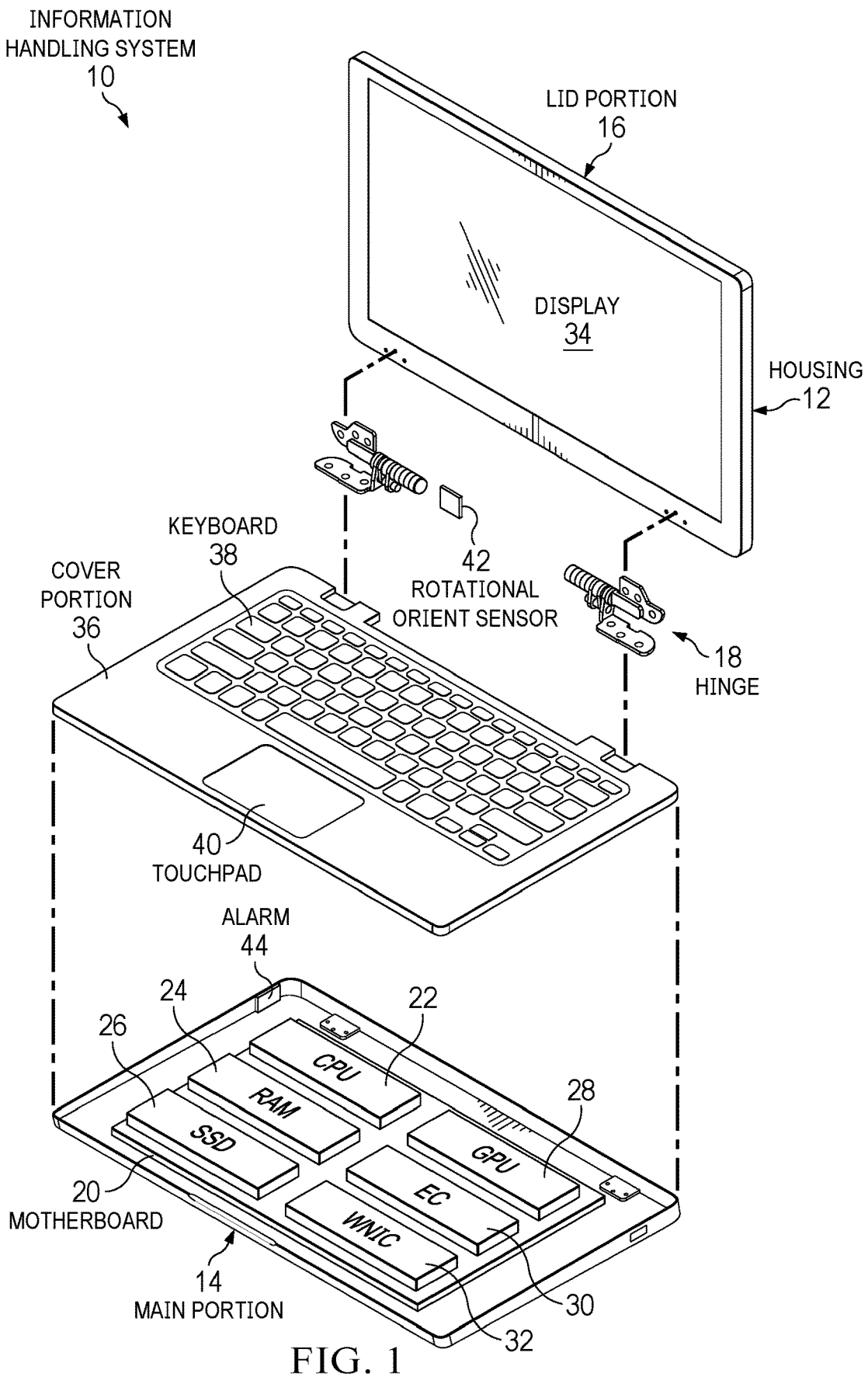

Referring now to FIG. 1, an information handling system 10 hinge 18 is depicted with operational and overbend rotation ranges. Information handling system 10 is built in a portable housing having a main portion 14 and lid portion 16 rotationally coupled by a set of hinges 18. Main portion 14 couples a motherboard 20 that includes wirelines to support communication between processing components that cooperate to process information. A central processing unit (CPU) 22 executes instructions to process information in cooperation with a random access memory (RAM) 24 that stores the information and instructions. A solid state drive (SSD) 26 provides persistent storage of information and instructions, such as an operating system and applications. A graphics processing unit (GPU) 28 interfaces with CPU 22 to further process information and define visual images for presentation at a display 34 integrated in lid portion 16, such as by defining pixel values. An embedded controller 30 executes firmware instructions from flash or other non-transitory memory to manage physical operating conditions in the information handling system, such as application of power and maintenance of thermal constraints. A wireless network interface controller (WNIC) 32 supports communication with external devices, such as through WIFI and BLUETOOTH. A housing cover portion 36 couples over main portion to enclose the processing components and support a keyboard 38 and touchpad 40 that accept end user inputs.

During normal operation, housing 12 rotates about hinge 18 to an open position that holds display 34 in a raised position for viewing over keyboard 38, which is positioned to accept typed inputs from an end user viewing display 34. Generally, normal operations take place in an operational rotation range of between zero and 120 degrees of main portion 14 relative to lid portion 16. In the closed position, the information handling system is configured to travel with the keyboard and display protected, and can also operate by interacting with peripheral devices, such as through a docking station. In the open position, a rotational orientation of between 90 and 120 degrees will generally hold display 34 in a viewing position that is comfortable for an end user who is typing at keyboard 38. In some instances, the operational rotation range my extend to 135 degrees, however, past 135 degrees the keyboard becomes less usable for an end user viewing the display while typing. Rotation beyond the operational rotation range crosses into an overbend rotation range that hinges 18 have a more limited ability to manage without failure. An overbend rotation range of between 120 and 180 degrees of rotation is not supported for repeated cycles since the information handling system does not have an operational need to rotate the housings into the overbend rotation range. However, by supporting rotation in the overbend rotation range, hinge 18 avoids an overstress condition at housing 12 that can result in damage to the housing and components. When a rotational orientation sensor 42 detects the overbend rotation range, an alarm 44 provides an alert to the end user to avoid the overbend rotation situation. For example, rotational orientation sensor 42 is a rheostat or other switch that applies power to a speaker and LED alarm that provides and audible and visible alert of the overbend event. In addition, as is set forth in greater detail below, hinge 18 transitions from an operational torque in the operational range to an overbend torque in the overbend range as a "soft" stop that alerts an end user of the over rotation.

Figure 2A:
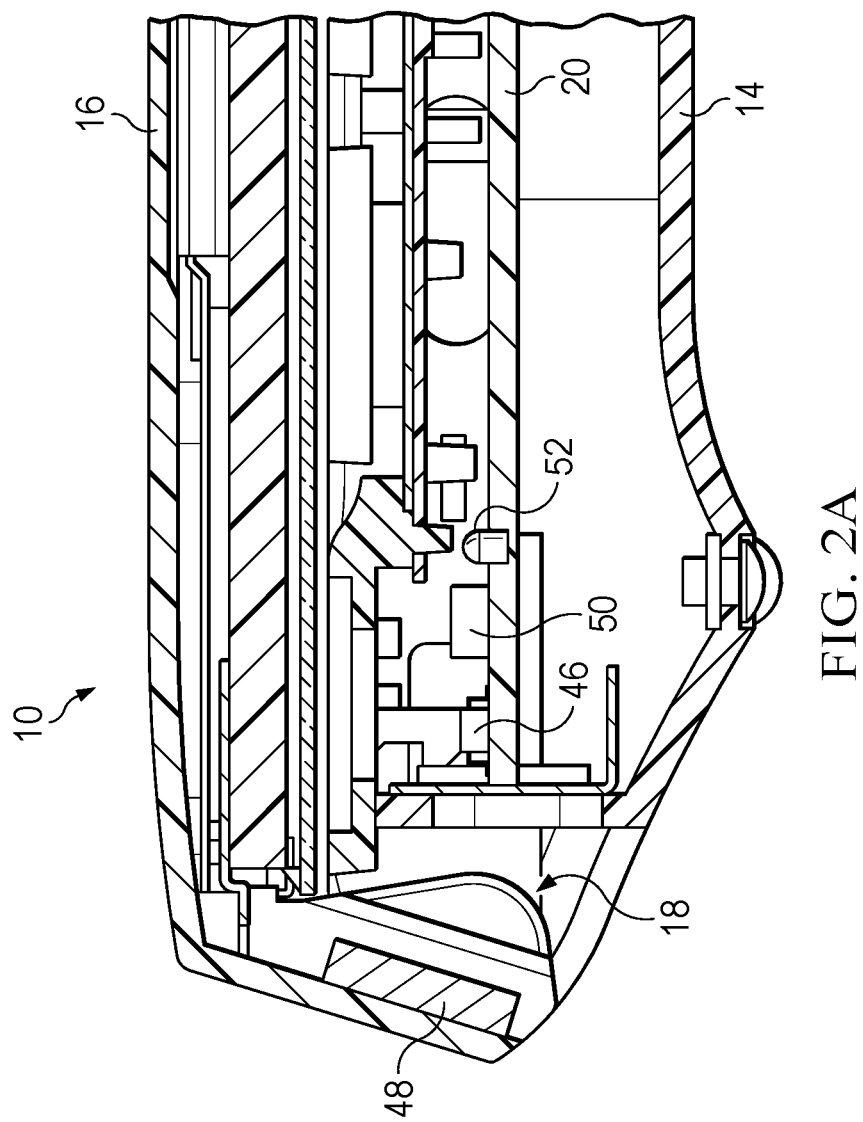
FIGS. 2A-2E depict side sectional views of the portable information handling system depicting rotation between an operational range and an overbend range that results in an overbend alert.
Figure 2B:
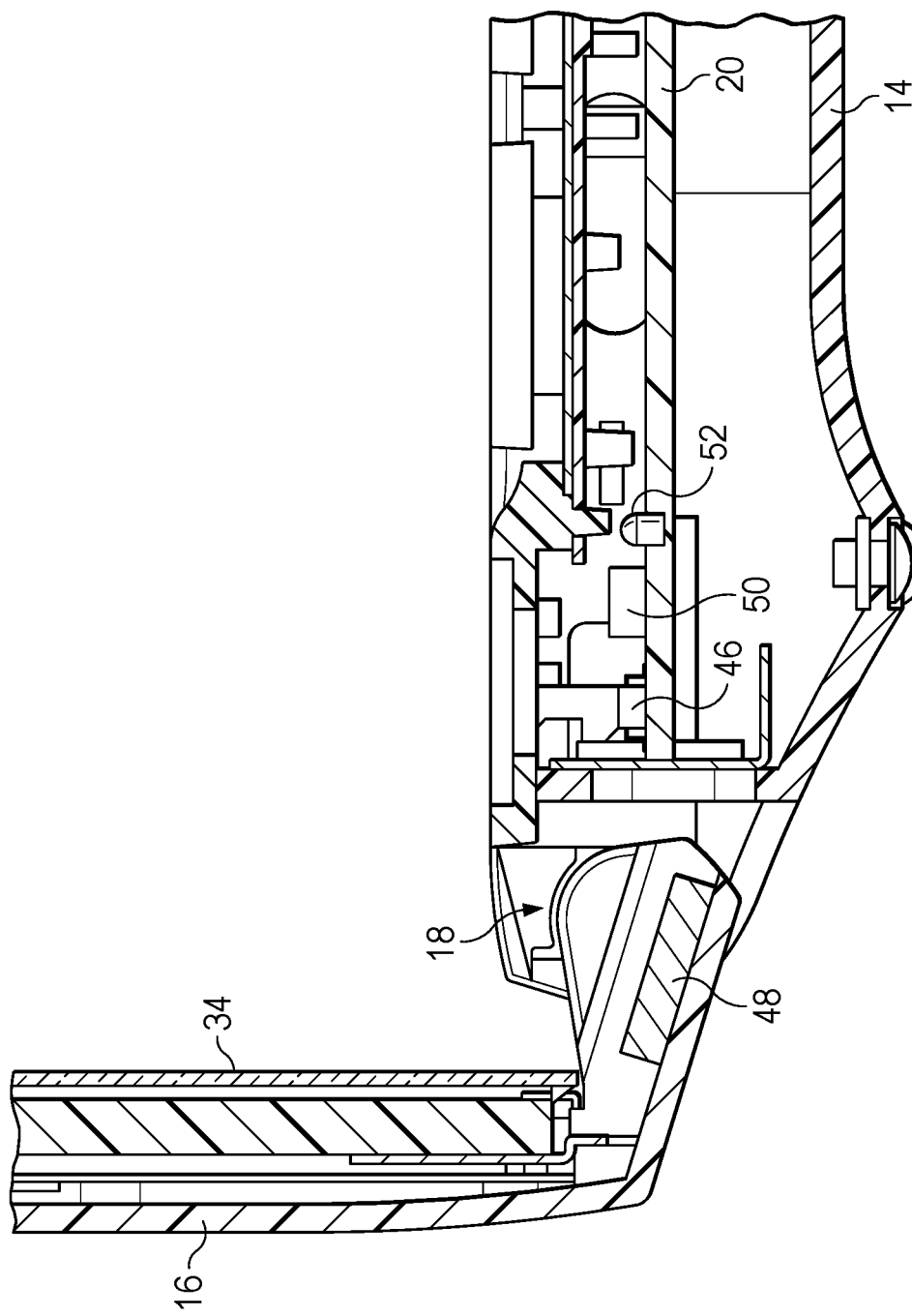
Figure 2C:
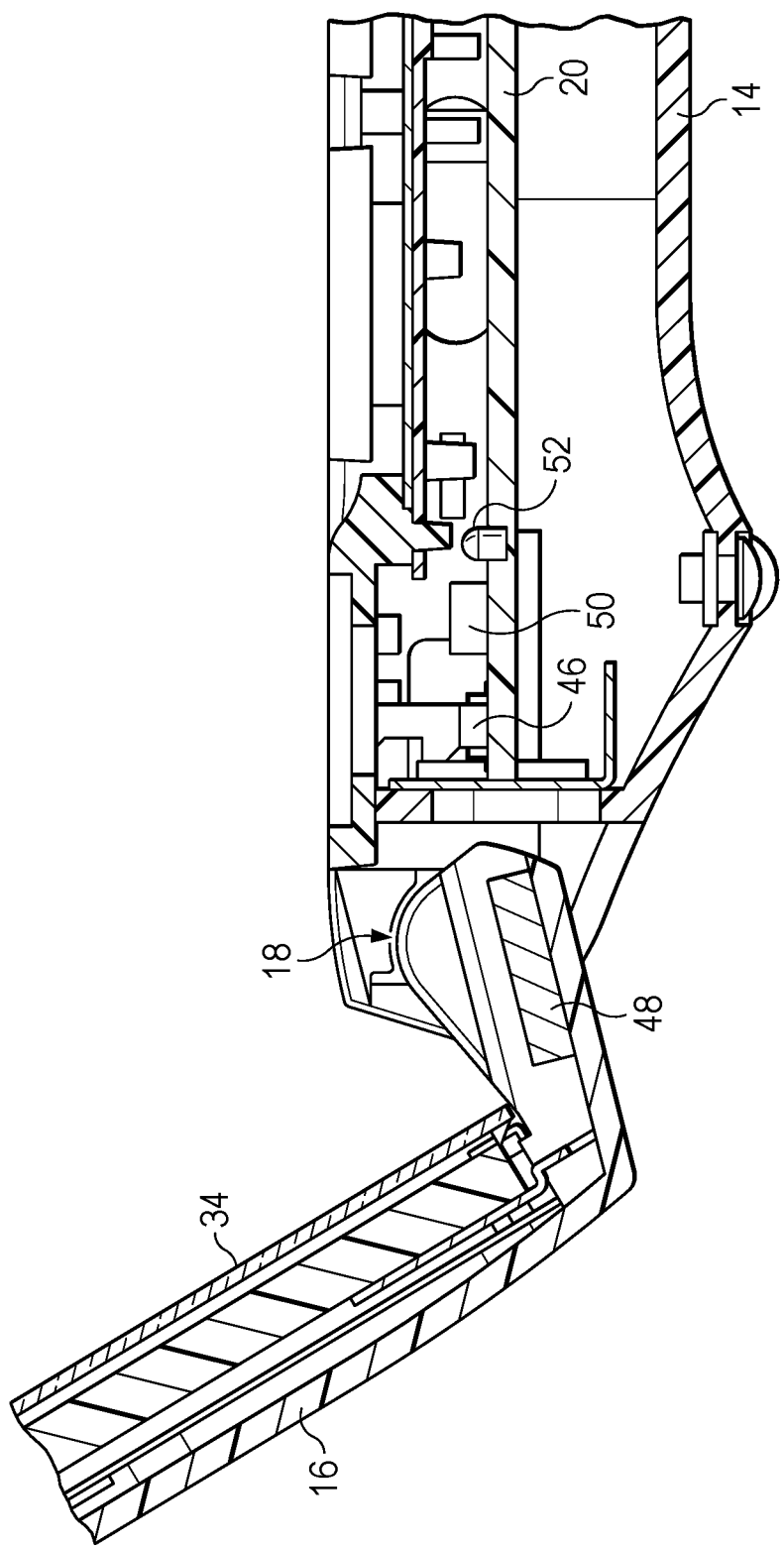
Figure 2D:
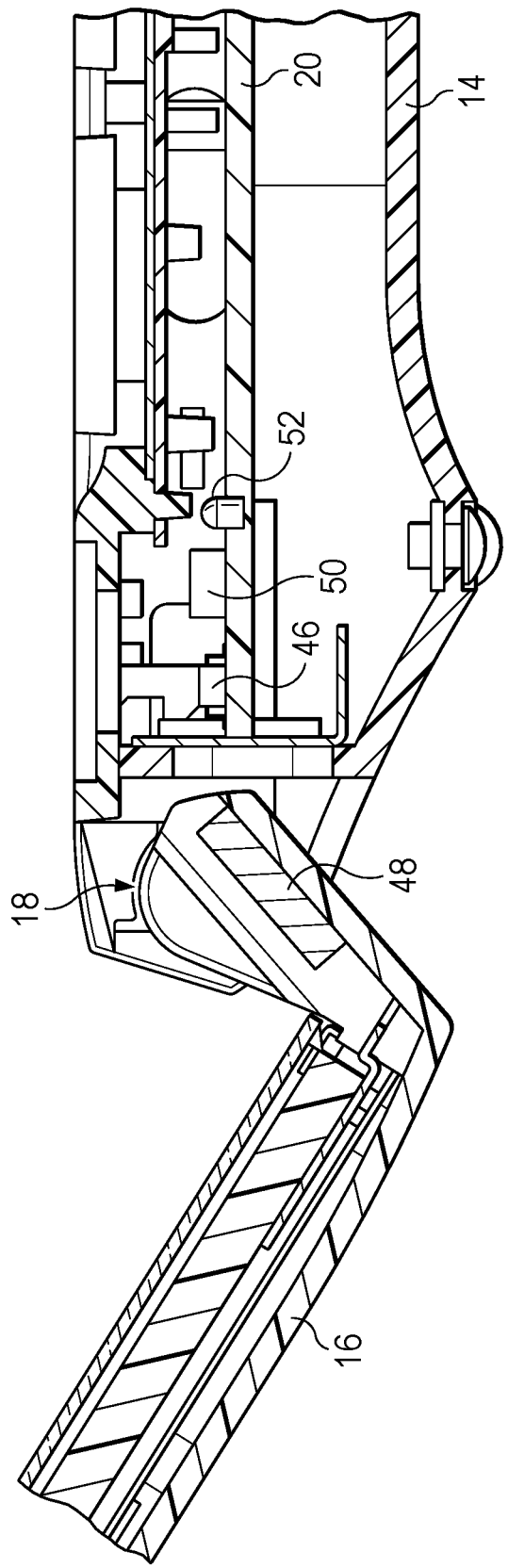
Figure 2E:
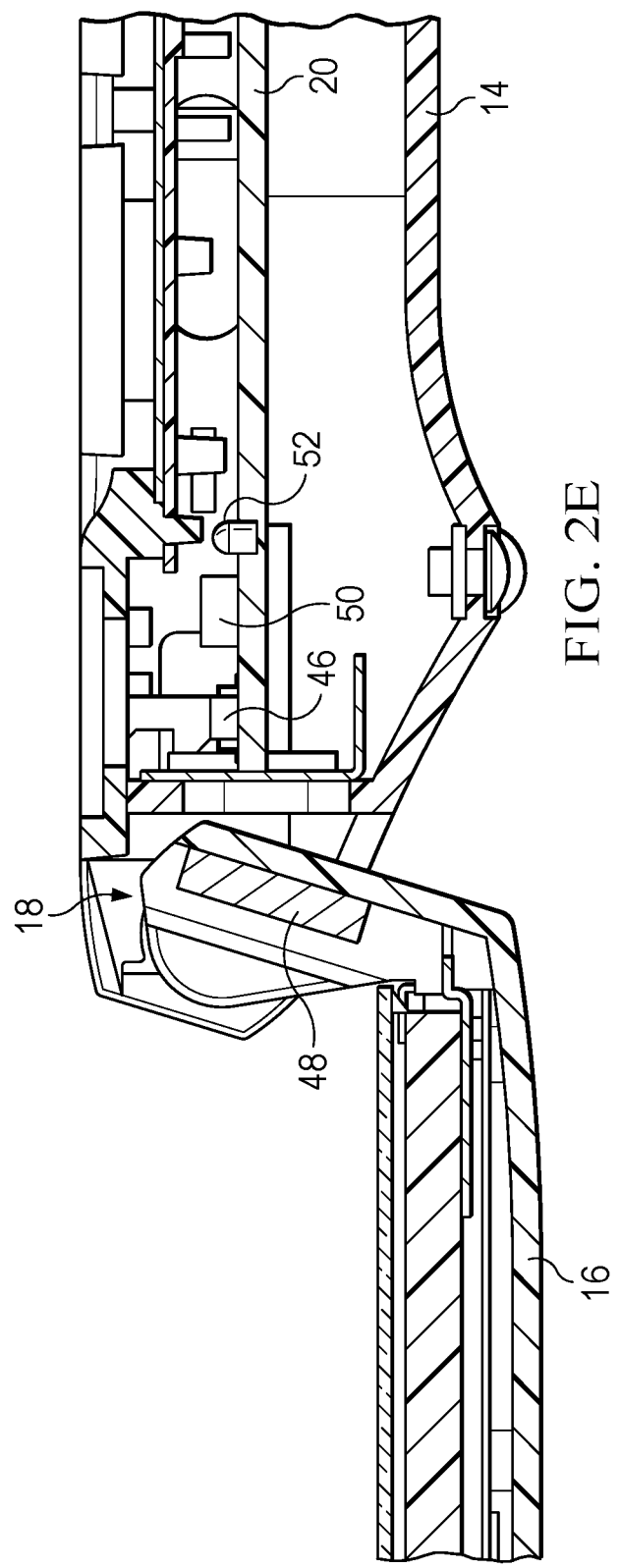

Referring now to FIGS. 2A, 2B, 2C, 2D and 2E, side sectional views of portable information handling system 10 depict rotation between an operational range and an overbend range that results in an overbend alert. FIG. 2A depicts lid portion 16 rotated about hinge 18 to a closed position relative to main portion 14. A magnet 48 couples to hinge 18 distant relative to a Hall sensor 46 so that the operational rotation range is indicated by Hall sensor 46. Motherboard 20 supports Hall sensor 46, a speaker 50 and an LED 52 so that detection by Hall sensor 46 issues an audio alert by speaker 50 and LED 52. For example, Hall sensor 46 is monitored by logic executing on an embedded controller coupled to motherboard 20 that sets off the audible and visible alert is an overbend rotational orientation is detected. FIG. 2B depicts rotation of lid portion 14 by 90 degrees relative to main portion 14 in the operational rotation range having display 34 in a viewing position over the system keyboard, which is positioned to accept touch inputs. FIG. 2C depicts rotation of lid portion 16 by 120 degrees to the end of the operational rotation range. At the 120 degrees of rotation, magnet 48 approaches Hall sensor 46 and hinge 18 reaches a soft stop indicated by an increased torque that resists rotation about hinge 18. The operational torque of the operational rotation range is provided by hinge 18 to support end user interactions that open and close the housing and hold the housing in a rotational orientation selected by the end user. At the end of the operational rotation range as the housing rotates past 120 degrees to the overbend range, an overbend torque is generated by hinge 18 to make rotation more difficult. FIG. 2D depicts rotation past 120 degrees to 135 degrees having magnet 48 brought into range of Hall sensor 46 to trip an overbend alert with audible sound from speaker 50 and illumination from LED 52. In alternative embodiments, a haptic alert may also issue that vibrates housing 12. FIG. 2E depicts lid portion 16 rotated 180 degrees to end of the rotational range. Although the hinge arrangement allows full rotation of 180 degrees, the rotation through the overbend rotation range has a high torque resistance that indicates over rotation and limits an end user ability to perform repeated cycles.

Figure 3:
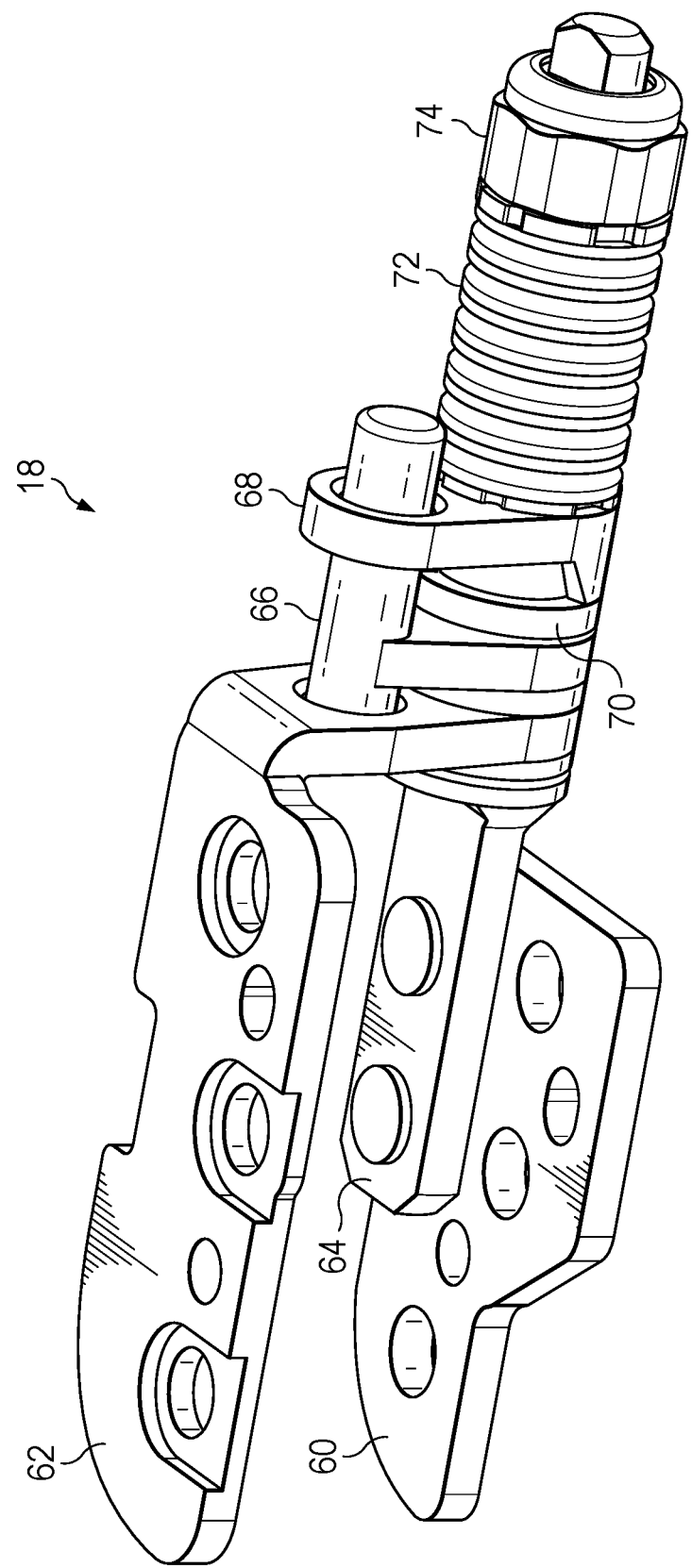
FIG. 3 depicts a side perspective view of a hinge configured to generate an operational torque in an operational rotational range and an overbend torque in an overbend rotational range.

Referring now to FIG. 3, a side perspective view depicts a hinge 18 configured to generate an operational torque in an operational rotational range and an overbend torque in an overbend rotational range. In the example embodiment, a first bracket 60 couples to an axle 64 to rotate relative to a second bracket 62. Each of the first and second brackets 60 and 62 couple to a housing portion to rotate the housing in the operational and overbend rotational ranges. Second bracket 62 couples to a support member 66 that supports axle 64 along a rotational axis, with axle 64 inserted through an opening of support member 66 and an opening of a torque member 68 to define the rotational axis. A cam member 70 has an opening through which the axle inserts so that cam member 70 couples between support member 66 and torque member 68. A nut 74 couples to the end of axle 64 to compress Belleville washers 72 so that friction of cam member 70 between support member 66 and torque member 68 generates torque that resists rotation of axle 64, as is described in greater detail below.

Figure 4:
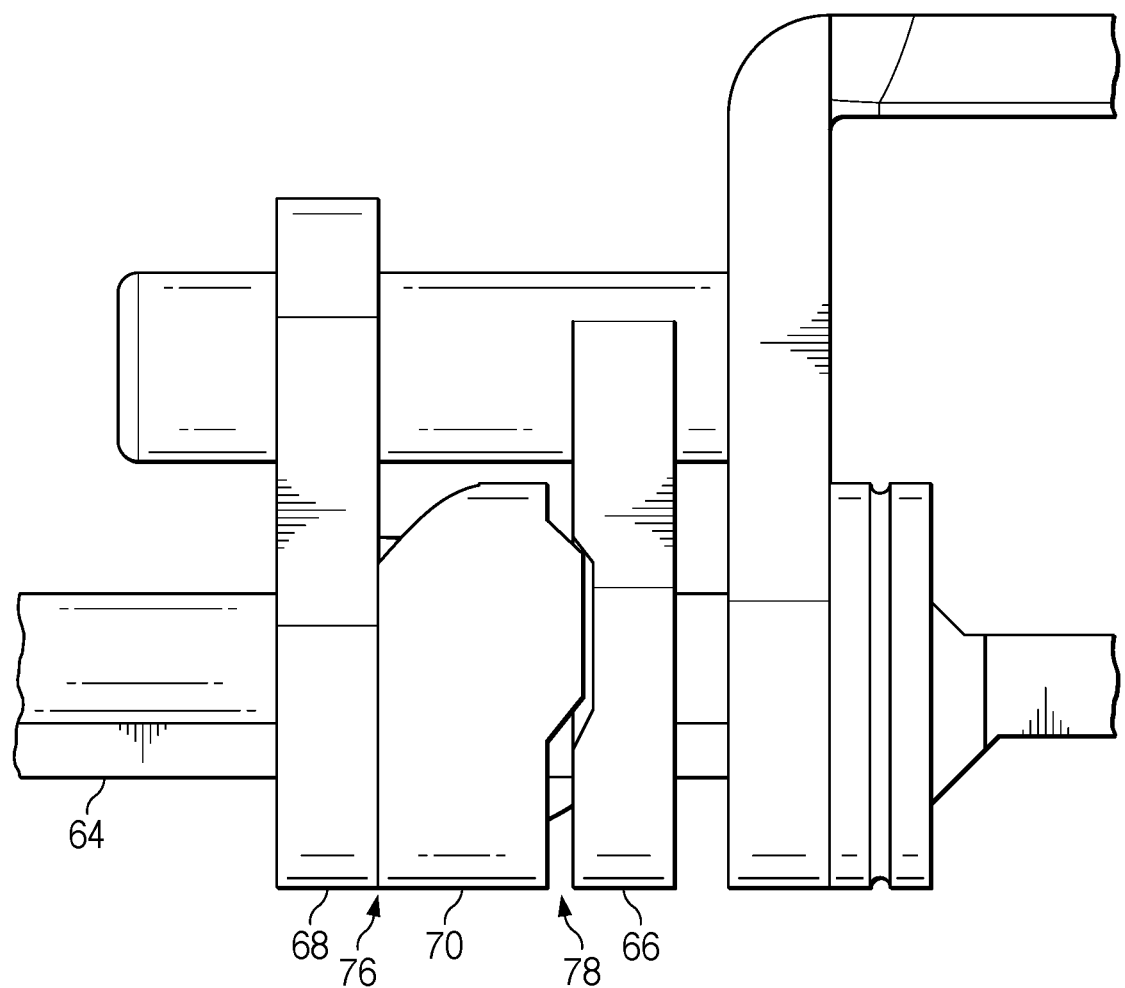
FIG. 4 depicts a side view of the hinge having a cam member compressed against a support member and torque member to generate different amounts of torque based upon rotational orientation.

Referring now to FIG. 4, a side view depicts the hinge having a cam member 70 compressed against a support member 66 and torque member 68 to generate different amounts of torque based upon rotational orientation. Support member 66 extends an arm parallel to axle 64 so that a first opening of torque member 68 accepts axle 64 and a second opening of torque member accepts the arm of support member 66. In the example embodiment, a first set of opposing cam surfaces 76 formed between cam member 70 and torque member 68 generates a first torque in a first torque rotational range. A second set of cam surfaces 78 formed between cam member 70 and support member 66 generates a second torque in a second torque rotational range. In the example embodiment, operational torque is generated by cam surfaces formed in cam member 70 and support member 66 as the cam surfaces 78, and overbend torque is generated by cam surfaces formed in cam member 70 and torque member 68 as cam surfaces 76. In an alternative embodiment, cam surfaces may be located on only one side of cam member 70 so that both operational torque and overbend torque are generated at the same set of cam surfaces. In the example embodiment, cam surfaces 78 create operational torque of 4.5 kgf-cm plus a detent in one area, and cam surfaces 76 create 30 kgf-cm of torque with a 30 degree 1.5 mm ramp in the cam surface at the overbend rotation range. In the example embodiment, the ramp to the full cam surface provides a ramped increase in the overbend torque from operational torque at 120 degrees to the full overbend torque at 135 degrees, as is depicted by the graph in FIG. 8.

Figure 5:
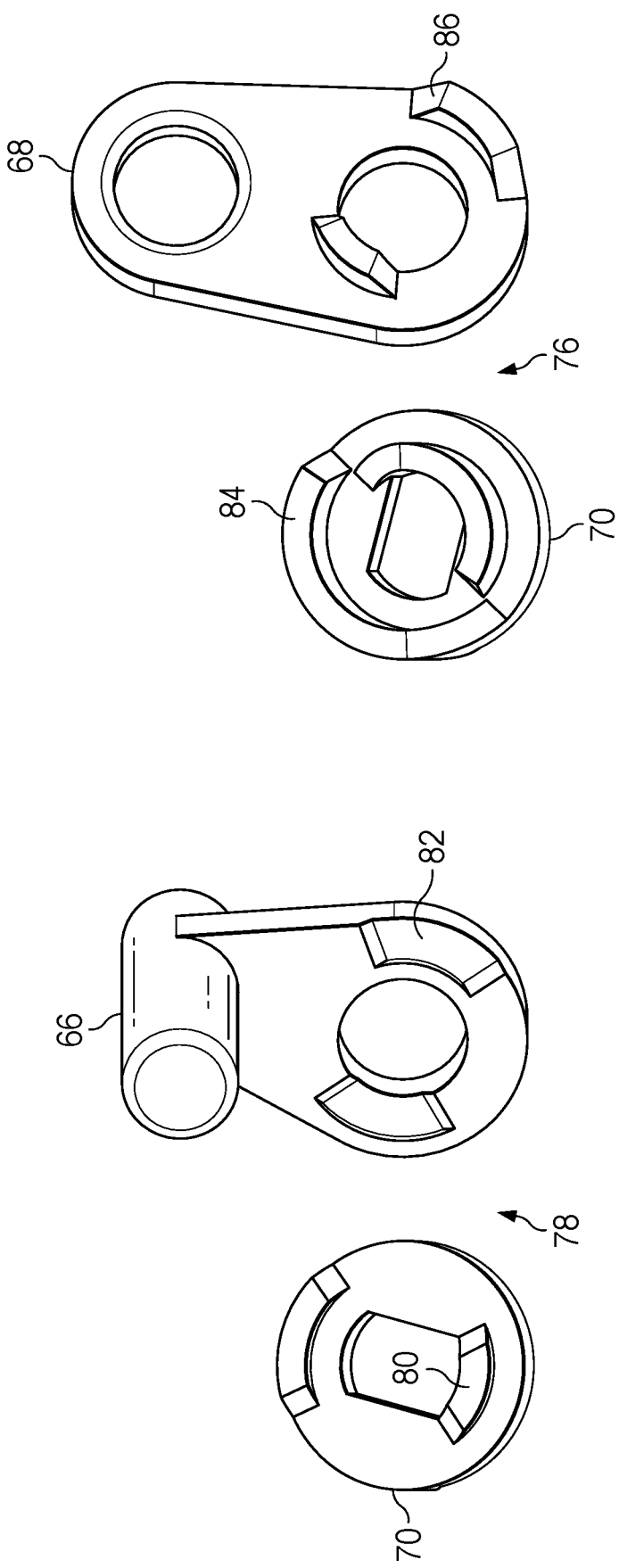
FIG. 5 depicts front and rear views of the support member, torque member and cam member of an example of cam surfaces that generate operational torque and overbend torque.

Referring now to FIG. 5, front and rear views of support member 66, torque member 68 and cam member 70 depict an example of cam surfaces that generate operational torque and overbend torque. The first set of opposing cam surfaces 76 have a first set of extensions 86 of torque member 68 that extend towards cam member 70 and extensions 84. The extensions 84 and 86 contact and engage against each other during rotation in the overbend rotation range to generate the overbend torque. The second set of opposing cam surfaces 78 have a first set of extensions 80 of cam member 70 that extend towards extensions 82 of support member 66. The second set of opposing cam surfaces generate the operational torque and can include variations to define detents, such as at the closed position.

Figure 6A:
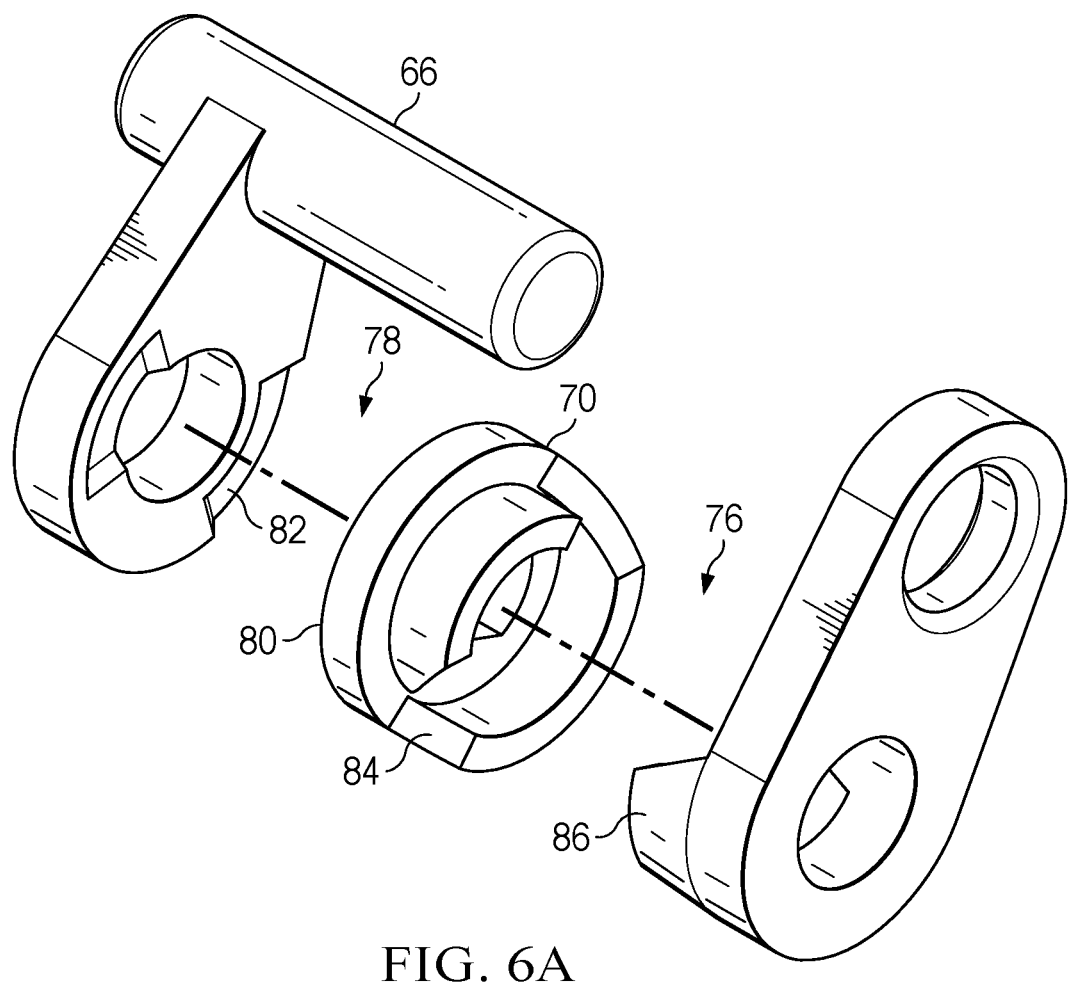
FIGS. 6A and 6B depict a side perspective exploded view of the cam surfaces alignment of the extensions to generate the operational and overbend torques in the operational and overbend rotation ranges.
Figure 6B:
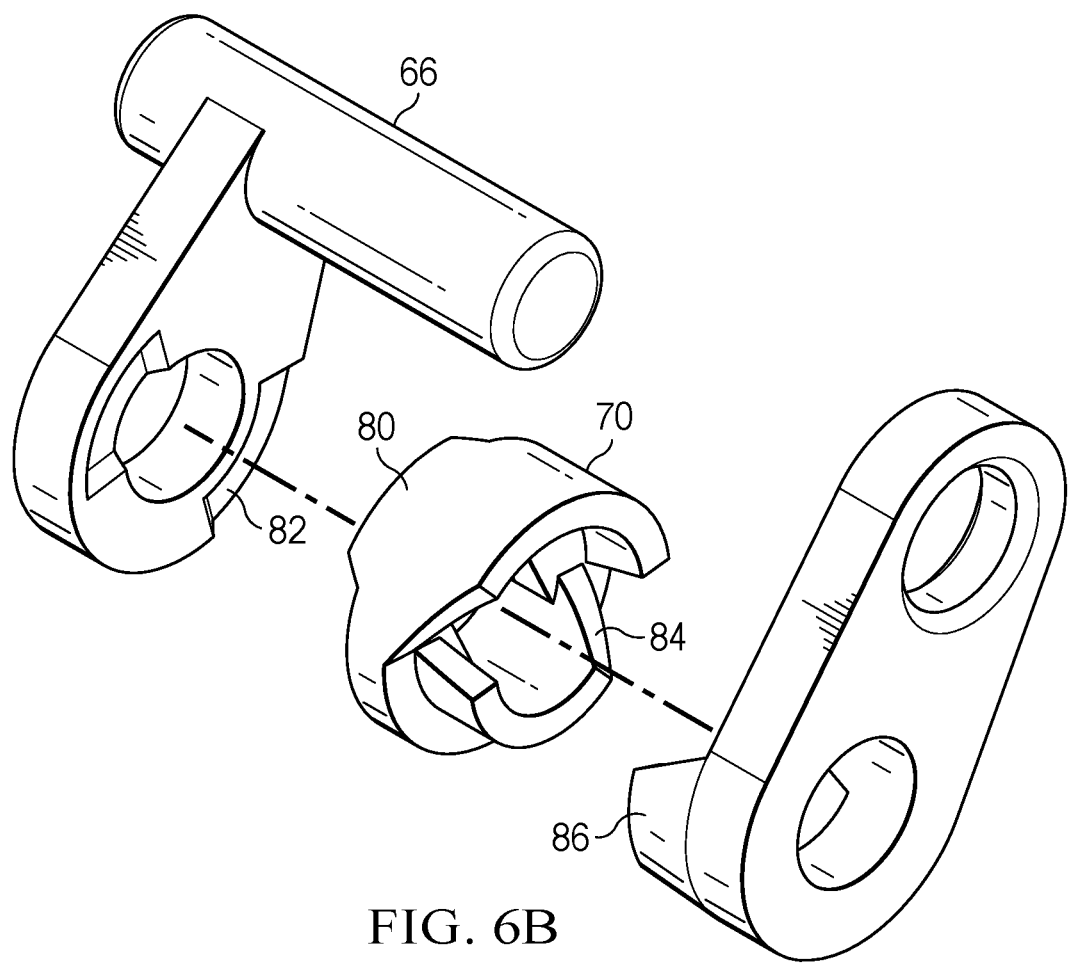

Referring now to FIGS. 6A and 6B, a side perspective exploded view of the cam surfaces depicts the alignment of the extensions to generate the operational and overbend torques in the operational and overbend rotation ranges. FIG. 6A depicts extensions 80 and 82 of support member 66 and cam member 70 aligned at a closed orientation to generate operational torque that keeps the housing closed and is overcome with an end user force to rotate the housing open for use. In the closed position of FIG. 6A, extensions 84 and 86 of cam member 70 and torque member 68 are misaligned so that torque is not generated in the operational rotation range. FIG. 6B depicts extensions 80 and 82 of support member 66 and cam member 70 misaligned at 135 degrees of rotation so that no operational torque is generated. In the overbend rotation range at 135 degrees open position, extensions 84 and 86 of cam member 70 and torque member 68 are aligned so that overbend torque is generated to indicate a rotation stop to an end user. The amount of torque is increased from the rotation angle of 120 degrees to 135 degrees by a ramp in the extension to increase frictional forces working against rotation.

Figure 7:
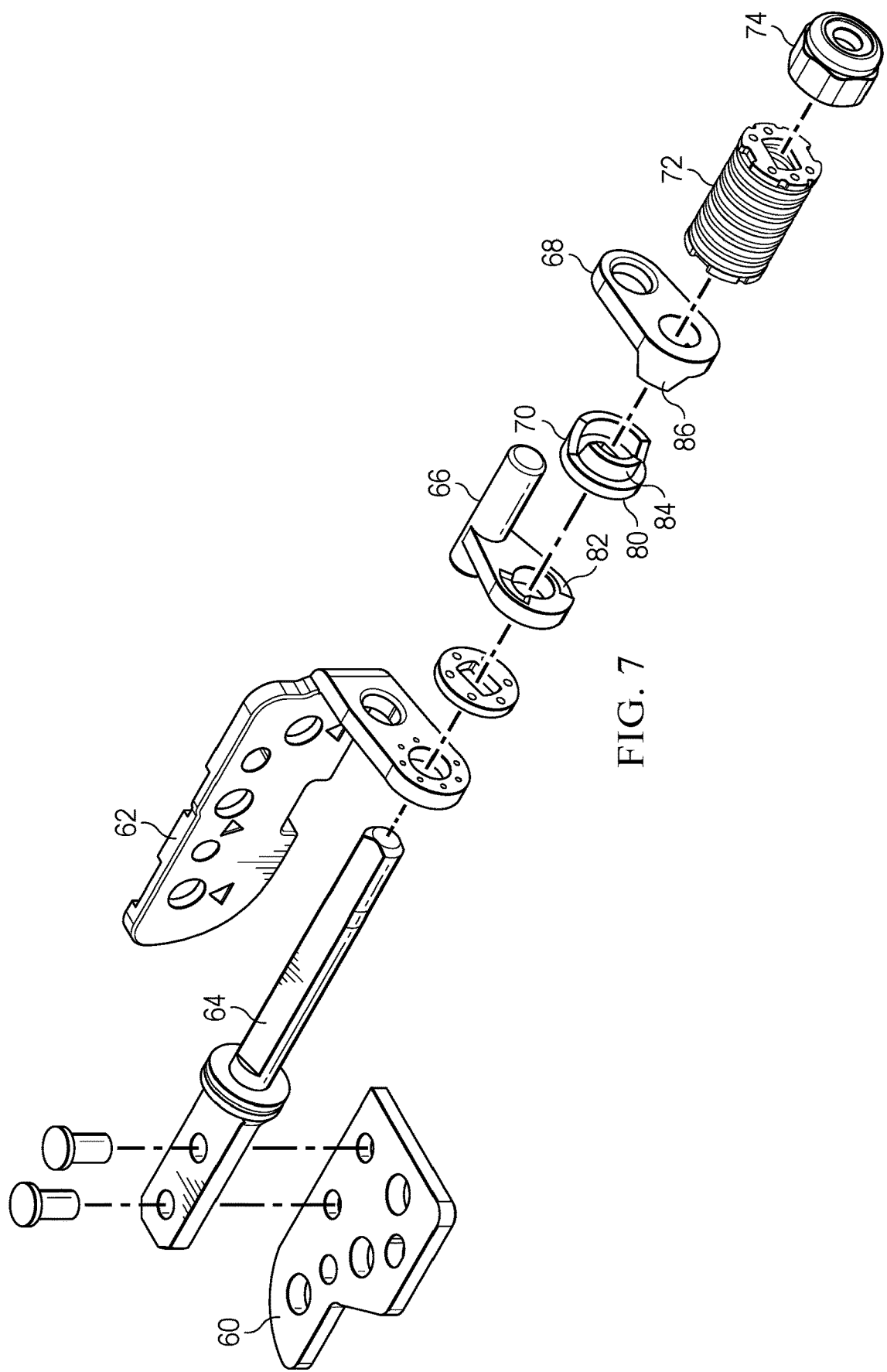
FIG. 7 depicts an exploded perspective view of the hinge.

Referring now to FIG. 7, a side perspective exploded view depicts the hinge. Bracket 60 couples to axle 64 with rivets. Axle 64 has a key surface that inserts through round openings of bracket 62, support member 66 and torque member 68, but engages cam member 70 and Bellville washers 72 so that rotation of axle 64 is translated to cam member 70 and Bellville washers 72 with compression of nut 74 to generate friction. Support member 66 has an arm that inserts into torque member 68 and bracket 62 to hold cam extensions 82 and 86 stationary relative to axle 64 so that torque is generated when axle 64 rotates cam member 70 and its cam extensions 80 and 84. The amount of torque is adjusted by changing the amount of overlap of the cam extensions 80, 82, 84 and 86, and the rotational orientations at which the overlaps occur.

Figure 8:
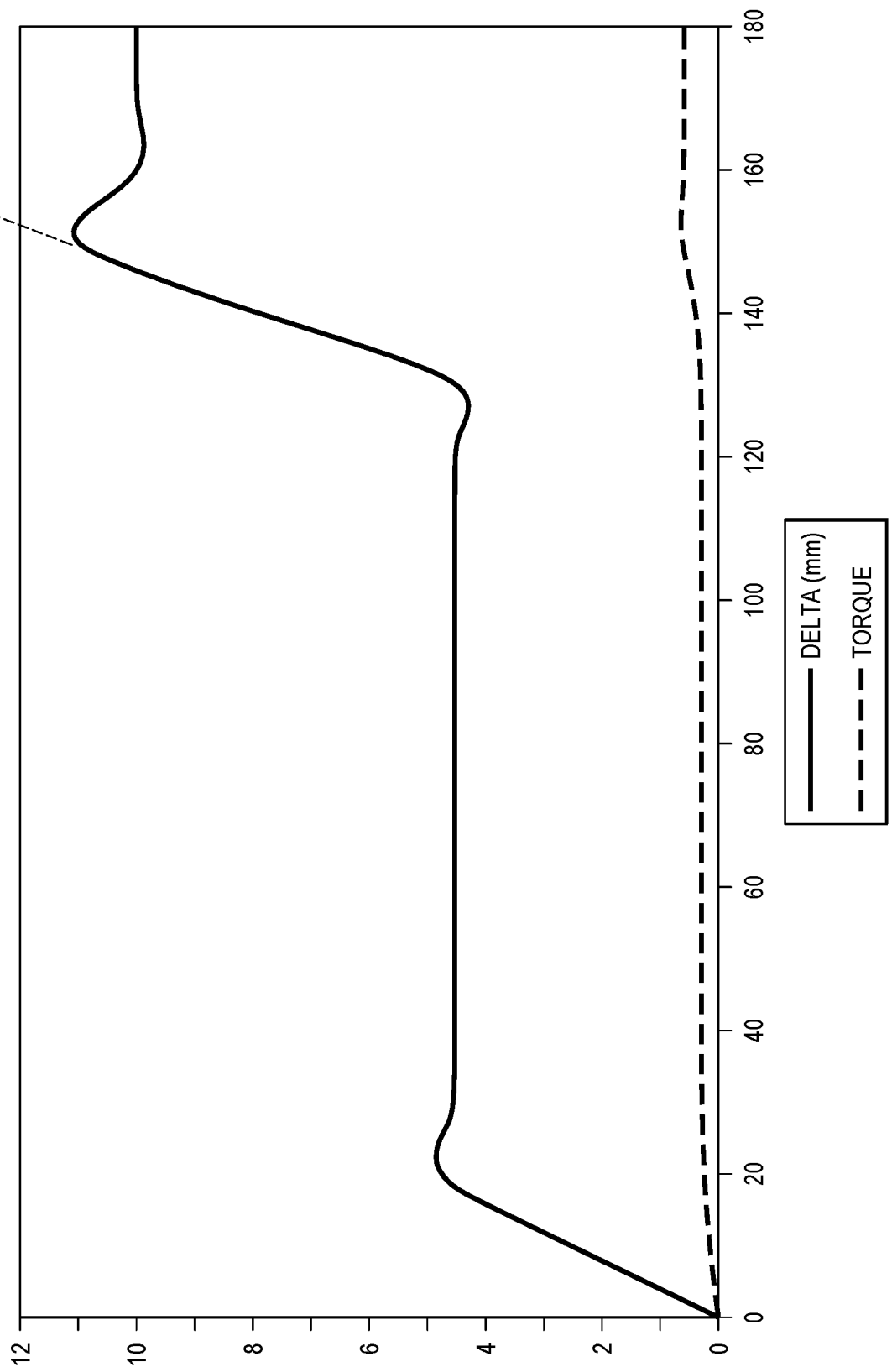
FIG. 8 depicts a graph of the torque generated in on example of the hinge in the operational and overbend rotation ranges.

Referring now to FIG. 8, a graph is depicted of the torque generated in one example of the hinge in the operational and overbend rotation ranges. From the closed position at zero degrees of rotation, the cam surfaces generate an increased amount of torque to just above 4.5 kgf-cm at 20 degrees open. This operational torque remains steady through the operational rotation range of 120 degrees. At 120 degrees of rotation, the overbend torque ramps from the operational torque to approximately 11 kgf-cm at 135 degrees of rotation. In various embodiments, the overbend torque is at least twice the operational torque. Once the overbend torque ramps to the desired value, the overbend torque remains stable through the remainder of the overbend rotation range.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a lid portion and a main portion;
a processor coupled to the housing main portion and operable to execute instructions that process information;
a memory coupled to the housing main portion and interfaced with the processor, the memory operable to store the instructions and information;
a display coupled to the lid portion and interfaced with the processor, the display operable to present the information as visual images; and
a hinge rotationally coupling the housing main portion and lid portion, the hinge having an axle configured to rotate, a first bracket coupled to the axle and one of the main portion or lid portion, a second bracket coupled to the axle and the other of the main portion or lid portion, a first member rotating with the axle, a second member stationary relative to the axle, and first and second opposing cam surfaces, the first opposing cam surfaces generating an operational torque throughout an operational rotational range, the second opposing cam surfaces generating an overbend torque throughout an overbend rotational range.

2. The information handling system of claim 1 further comprising:
a rotation sensor operable to detect hinge rotational orientation; and
an alarm operable to provide an alert in the overbend rotational range.

3. The information handling system of claim 2 wherein the rotation sensor comprises a Hall sensor that detects a magnet in the overbend orientation.

4. The information handling system of claim 2 wherein the rotation sensor comprises a switch that applies power to the alarm in the overbend orientation.

5. The information handling system of claim 1 wherein the operational torque comprises between four and five kgf-cm.

6. The information handling system of claim 5 wherein the overbend comprises greater than ten kgf-cm.

7. The information handling system of claim 1 wherein the operational rotational range comprises closed to 120 degrees open.

8. The information handling system of claim 7 wherein the overbend rotational range comprises 120 degrees to 180 degrees.

9. The information handling system of claim 1 comprising a 30 degree 1.5 mm ramp of the second set of cam surfaces to build torque from the operational torque to the overbend torque.

10. A method for managing information handling system housing rotation overbend, the method comprising:
generating an operational torque to resist the housing rotation in an operational rotation range; and
generating an overbend torque to resist the housing rotation in an overbend range, the overbend torque at least twice the operational torque.

11. The method of claim 10 further comprising:
detecting rotation of the housing from the operational range to the overbend range; and
in response to the detecting, generating an audible overbend alert with a speaker.

12. The method of claim 10 further comprising:
detecting rotation of the housing from the operational range to the overbend range;
in response to the detecting, generating a visual overbend alert by illumination of a light.

13. The method of claim 10 further comprising:
ramping up from the operational torque to the overbend torque in a transition range between the operational range and the overbend range.

14. The method of claim 10 further comprising:
generating the operational torque with a first set of cams coupled to an axle; and
generating the overbend torque with a second set of cams coupled to the axle.

15. The method of claim 14 further comprising:
coupling a member to the axle; and
rotating the member with axle to generate the operational torque and the overbend torque.

16. The method of claim 15 further comprising:
forming a portion of the first set of cams on a first side of the member; and
forming a portion of the second set of cams on a second side of the member.

17. An information handling system hinge to rotationally couple first and second housing portions, the information handling system hinge comprising:
an axle configured to rotate;
a first bracket coupled to the axle and configured to couple to the first housing portion;
a second bracket coupled to the axle and configured to couple to the second housing portion;
a first member rotating with the axle;
a second member stationary relative to the axle; and
first and second opposing cam surfaces associated with the first and second members, the first opposing cam surfaces generating an operational torque throughout an operational rotational range, the second opposing cam surfaces generating an overbend torque throughout an overbend rotational range.

18. The information handling system hinge of claim 17 further comprising:
a rotation sensor operable to detect hinge rotational orientation; and
an alarm operable to provide an alert in the overbend rotational range.

19. The information handling system hinge of claim 18 having a transition rotational range between the operational rotational range and the overbend rotational range, the second opposing cam surfaces increasing the torque in the transition rotational range from the operational torque to the overbend torque.

20. The information handling system of claim 19 wherein the first member has a portion of the first opposing cam surfaces on a first side and a portion of the second opposing cam surfaces on a second side opposite the first side.

* * * * *